(12) United States Patent
Kim et al.

(10) Patent No.: US 7,952,660 B2
(45) Date of Patent: May 31, 2011

(54) METHOD OF FABRICATING BLACK MATRICES OF COLOR FILTER

(75) Inventors: Sung-woong Kim, Suwon-si (KR); Won-sik Kim, Suwon-si (KR); Kye-si Kwon, Seoul (KR); Sang-Ii Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1019 days.

(21) Appl. No.: 11/593,616

(22) Filed: Nov. 7, 2006

(65) Prior Publication Data
US 2007/0196568 A1 Aug. 23, 2007

(30) Foreign Application Priority Data
Feb. 4, 2006 (KR) .................. 10-2006-0010923

(51) Int. Cl.
G02F 1/1333 (2006.01)
G02F 1/1335 (2006.01)
G02F 1/1339 (2006.01)

(52) U.S. Cl. .................. 349/110; 349/106; 349/190
(58) Field of Classification Search .................. 349/110, 349/106, 190
See application file for complete search history.

(56) References Cited

U.S. PATENT DOCUMENTS

2002/0047963 A1* 4/2002 Youn et al. ................ 349/110
2005/0258406 A1* 11/2005 Onishi et al. .............. 252/582

* cited by examiner

Primary Examiner — Nathanael R Briggs
(74) Attorney, Agent, or Firm — Stanzione & Kim, LLP

(57) ABSTRACT

A method of fabricating black matrices of a color filter. The method includes forming a light-shielding layer of an organic material, which is repulsive to ink, on a transparent substrate, forming the black matrices by patterning the light-shielding layer, and hard-baking the black matrices to maintain a plurality of pores which are formed in the black matrices in the forming of the light-shielding layer.

3 Claims, 6 Drawing Sheets

US 7,952,660 B2

METHOD OF FABRICATING BLACK MATRICES OF COLOR FILTER

CROSS-REFERENCE TO RELATED APPLICATIONS

This application claims priority under 35 U.S.C. §119(a) from Korean Patent Application No. 10-2006-0010923, filed on Feb. 4, 2006, in the Korean Intellectual Property Office, the disclosure of which is incorporated herein in its entirety by reference.

BACKGROUND OF THE INVENTION

1. Field of the Invention

The present general inventive concept relates to a method of fabricating black matrices of a color filter, and more particularly, to a method of fabricating black matrices of a color filter to improve a brightness uniformity of light.

2. Description of the Related Art

Cathode ray tube (CRT) monitors have been widely used to display information processed in electronic media devices such as TVs or computers. Recently, as the requirements for large size screens have increased, flat display devices such as liquid crystal displays (LCDs), plasma display panels (PDPs), organic light emitting diodes (OLEDs), light emitting diodes (LEDs), and field emission displays (FEDs) have been introduced. Since a power consumption of the LCDs is small, the LCDs are commonly used for computer monitors and notebooks computer screens.

In general, the LCD includes a color filter through which white light modulated by a liquid crystal layer passes to form an image in desired colors. Conventionally, the color filter includes red (R), green (G), and blue (B) pixels arrayed in a predetermined structure on a transparent substrate. The R, G, and B pixels are partitioned by black matrices.

FIG. 1 illustrates a phenomenon in which inks filing the spaces partitioned by black matrices 11 of a conventional color filter mix with each other, and FIG. 2 illustrates a phenomenon in which light leaks due to inks insufficiently filling the spaces partitioned by the black matrices 11 of the conventional color filter.

Referring to FIG. 1, the black matrices 11 are formed by coating a transparent substrate 10 with a light-shielding layer, baking the light-shielding layer, and patterning the baked light-shielding layer into a predetermined shape to form the black matrices 11. The black matrices 11 partition a plurality of spaces on the transparent substrate 10.

When the black matrices 11 are weakly repulsive to ink and a contact angle is small, an ink 13 filling a space partitioned by the black matrices 111 to form a pixel overflows into an adjacent space to form an adjacent pixel and mixes with another ink 14.

To overcome this problem, a contact angle between the black matrices 11 and the ink 13 is increased by increasing a repulsive force therebetween. In FIG. 2, black matrices 21 that are strongly repulsive to ink 23 are illustrated.

Referring to FIG. 2, since the black matrices 21 are formed to have a strong repulsive force against ink 23 filling a space partitioned by the black matrices 21 to form a pixel is prevented from overflowing into an adjacent space to form an adjacent pixel and mixing with another ink 24. However, it is difficult to coat the inks 23 into the spaces partitioned by the black matrices on a surface of the transparent substrate 20 and obtain a uniform ink thickness.

Accordingly, light leaks from a side portion of the black matrices 21, and as a result, a brightness of light from each space partitioned by the black matrices 21 of the color filter becomes non-uniform.

To solve the aforementioned problem, conventional methods of flatly coating a transparent substrate with ink are illustrated in FIGS. 3 to 4B. FIG. 3 illustrates an "Ink-jet printing method and apparatus for manufacturing color filters" disclosed in United States Patent Publication No. 20030030715, and FIGS. 4A and 4B illustrate an "Ink-jet manufacturing process and device for color filters" disclosed in United States Patent Publication No. 20030108804.

Referring to FIG. 3, black matrices 31 are formed on a transparent substrate 30. A pixel space that is partitioned by the black matrices 31 is coated with an ink 32 to form a pixel, and air is blown over the ink 32 by using an air nozzle 33 to flatly coat the pixel with the ink 32.

Referring to FIGS. 4A and 4B, a pixel that is partitioned by printing frames 41 is formed on a transparent substrate 40. Shielding films 42 are formed on the printing frames 41, and electrodes 51 and 52 are respectively installed below and above the printing frame 41.

When an electric field is induced by applying a voltage supplied from a voltage source 50 to the electrodes 51 and 52 after the pixel is coated with an ink 60, a contact angle between the ink 60 and the printing frames 41 decreases to flatten a surface of the ink, as illustrated in FIG. 4B.

However, in the method illustrated in FIG. 3 of coating the pixel with ink by blowing air over the surface of ink by using the air nozzle, it is difficult to supply air to dry and flatten the surface of the inks in all the pixels before the inks dry. On the contrary, the flatness of the surface of the inks may deteriorate due to the characteristics of the inks.

Also, it is difficult to implement the method illustrated in FIGS. 4A and 4B of flatting the surface of the inks by applying the electric field to the pixels, since conductive inks are used in that method.

SUMMARY OF THE INVENTION

The present general inventive concept provides a method of fabricating black matrices of a color filter capable of preventing inks from mixing and improving brightness uniformity of light.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of fabricating black matrices of a color filter, the method including forming a light-shielding layer made of an organic material repulsive to an ink on a transparent substrate, forming the black matrices by patterning the light-shielding layer, and hard-baking the black matrices to maintain a plurality of pores which are formed in the black matrices in the forming of the light-shielding layer.

The foregoing and/or other aspects and utilities of the present general inventive concept may also be achieved by providing a method of fabricating a color filter, the method including coating a layer on a surface of a substrate, soft-baking the layer, patterning the layer to form matrices defining a plurality of pixel areas on the substrate, first hard-baking the matrices to maintain a plurality of pores formed in the matrices in the patterning of the layer, injecting colored inks into the plurality of pixel areas and pores, and second hard-baking the matrices and the injected ink disposed in the pixel areas and the pores.

The first hard-baking may be performed for about 10 to 15 minutes at a temperature above about 200° C.

The second hard-baking may be performed for about 30 to 40 minutes at a temperature above about 200° C.

The first hard-baking and the second hard-baking may be performed at above about 200° C. for a total time of about 30 to 40 minutes.

The ink may permeate into the pores before the second hard-baking of the matrices is performed.

The second hard-baking may solidify the matrices and may dry the inks inside the pixel areas and pores with a uniform ink thickness.

The layer may include an organic material repulsive to ink.

The layer may include an ink-phobic material.

The foregoing and/or other aspects and utilities of the present general inventive concept may also be achieved by providing a method of fabricating a color filter, the method including forming a matrix having a plurality of partitions defining a plurality of pixel areas and a plurality of pores formed on the partitions, filling an ink into the pixel areas and the pores.

The forming of the matrix may include forming first pores on a first side of the partitions, and forming second pores on a second side of the partitions.

The first pores may contact the second pores.

The first pores may be spaced apart from the second pores.

The method may further include hard-baking the matrix after the filling of the ink into the pixel areas and the pores, wherein the ink permeates into the pores before the hard-baking of the matrix is performed.

The hard-baking of the matrix may solidify the matrix and may dry the inks inside the pixel areas and the pores with a uniform ink thickness.

The hard-baking may be performed for about 30 to 40 minutes at a temperature above about 200° C.

The method may further include partially hard-baking the matrix before the filling of the ink into the pixel areas and the pores is performed, wherein the partial hard-baking is performed for about 10 to 15 minutes at a temperature above about 200° C.

The foregoing and/or other aspects and utilities of the present general inventive concept may also be achieved by providing a color filter, including a substrate, and a matrix formed on the substrate having a plurality of partitions defining a plurality of pixel areas to be filled with an ink, and having a plurality of pores formed on the partitions to be filled with the ink.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
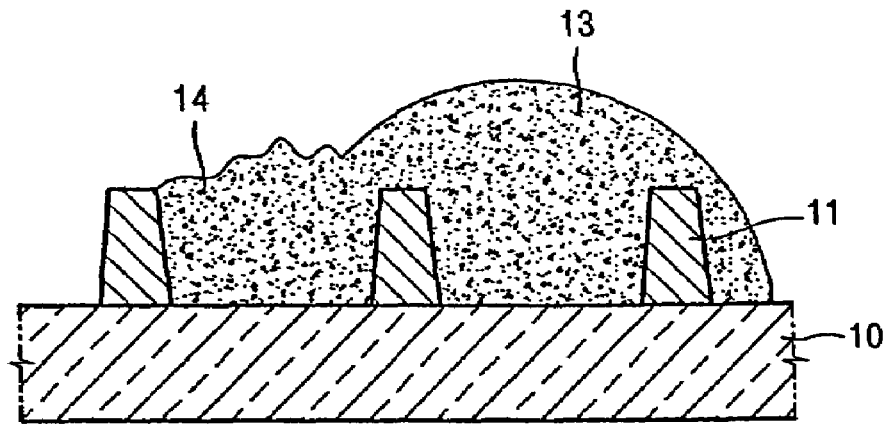
FIG. 1 illustrates a phenomenon in which inks filling spaces partitioned by black matrices of a conventional color filter mix with each other.
Figure 2:
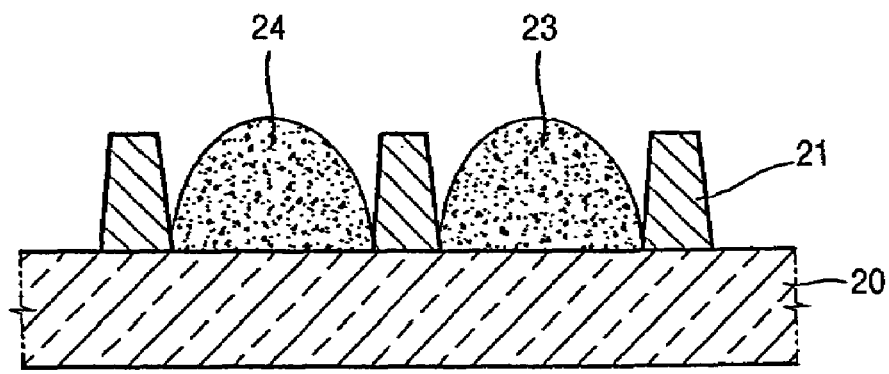
FIG. 2 illustrates a phenomenon in which light leaks due to inks insufficiently filling spaces partitioned by black matrices of a conventional color filter.
Figure 3:
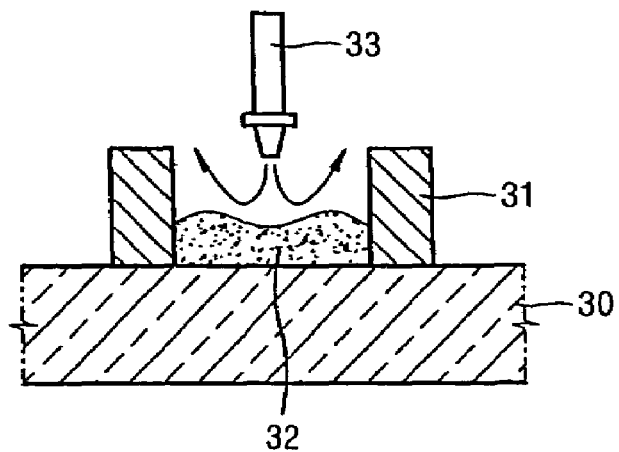
FIGS. 3, 4A and 4B illustrate conventional methods of flatly coating a transparent substrate with ink.
Figure 4A:
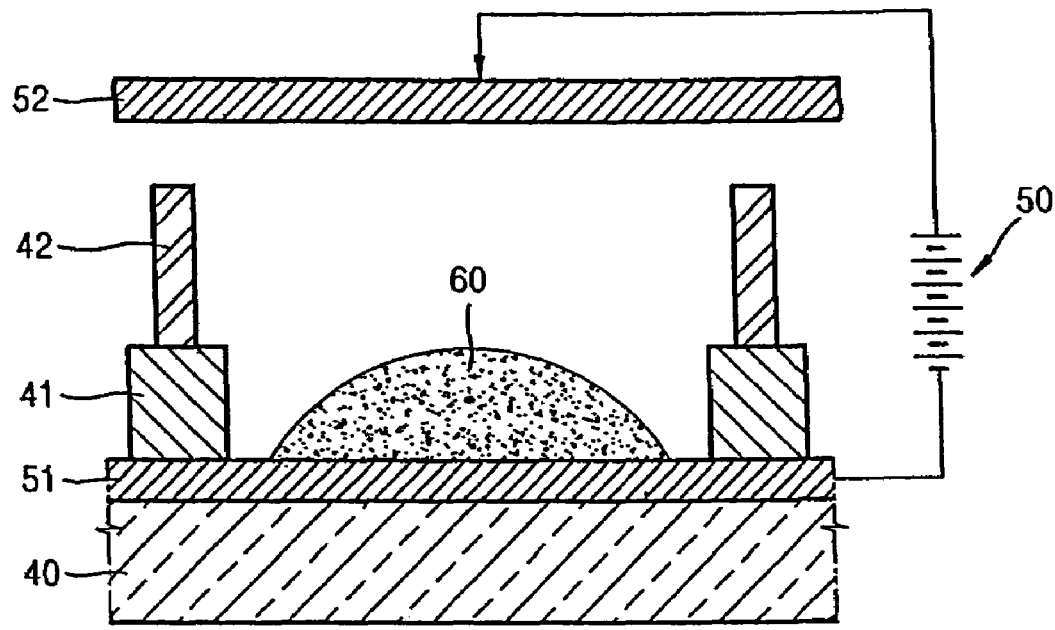
Figure 4B:
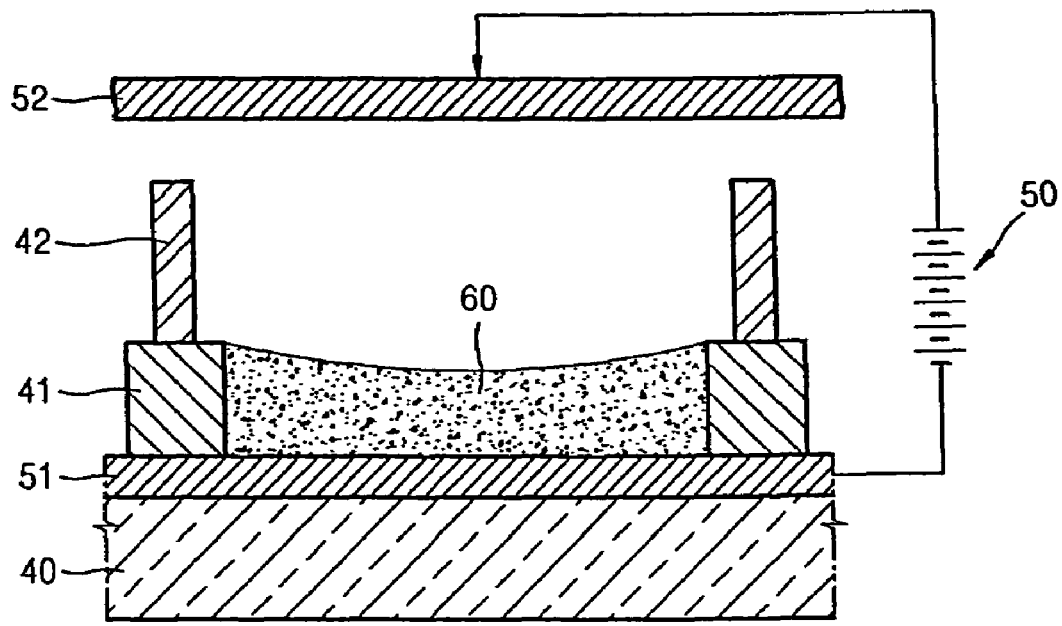

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5A:
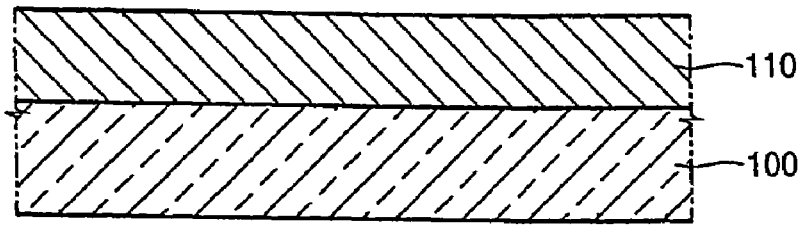
FIGS. 5A to 5C illustrate a method of fabricating black matrices of a color filter according to an embodiment of the present general inventive concept.
Figure 5B:
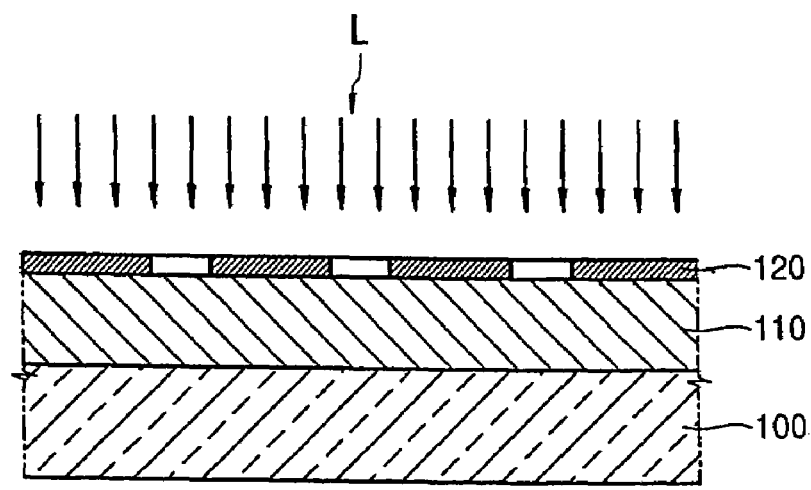
Figure 5C:
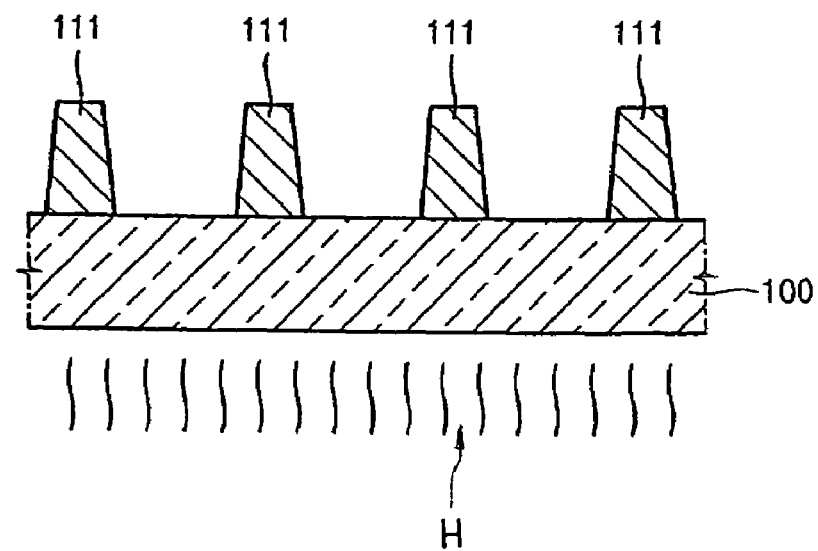

FIGS. 5A to 5C illustrate a method of fabricating black matrices of a color filter according to an embodiment of the present general inventive concept.

Referring to FIG. 5A, an organic material repulsive to ink is coated on a surface of a transparent substrate 100 with a predetermined thickness and softly baked to form a light-shielding layer 110. The transparent substrate 100 can be made of glass. Alternatively, the transparent substrate 100 may also be made of plastic. The organic material may be coated on the surface of the transparent substrate 100 by a coating method, such as a spin coating method, a die coating method, or a dip coating method.

Referring to FIGS. 5B and 5C, black matrices 111 are formed by patterning the light-shielding layer 110 into a predetermined shape. In the present embodiment, when the light-shielding layer 110 is made of a photosensitive material, the light-shielding layer 110 can be developed by light L exposure using a photomask 120 on which predetermined patterns are formed. Alternatively, when the light-shielding layer 110 is made of a non-photosensitive material, a photoresist 120 can be coated on the surface of the light shielding layer 110 and patterned through a photolithography process. Then, the light-shielding layer 110 can be etched using the patterned photoresist as an etching mask. Black matrices 111 may be formed by the patterning of the light-shielding layer 110. The black matrices 111 can be baked with a heat H. The black matrices 111 include a plurality of partitions to define a plurality of spaces (pixel areas) to be filled with an ink to form pixels.

Figure 6:
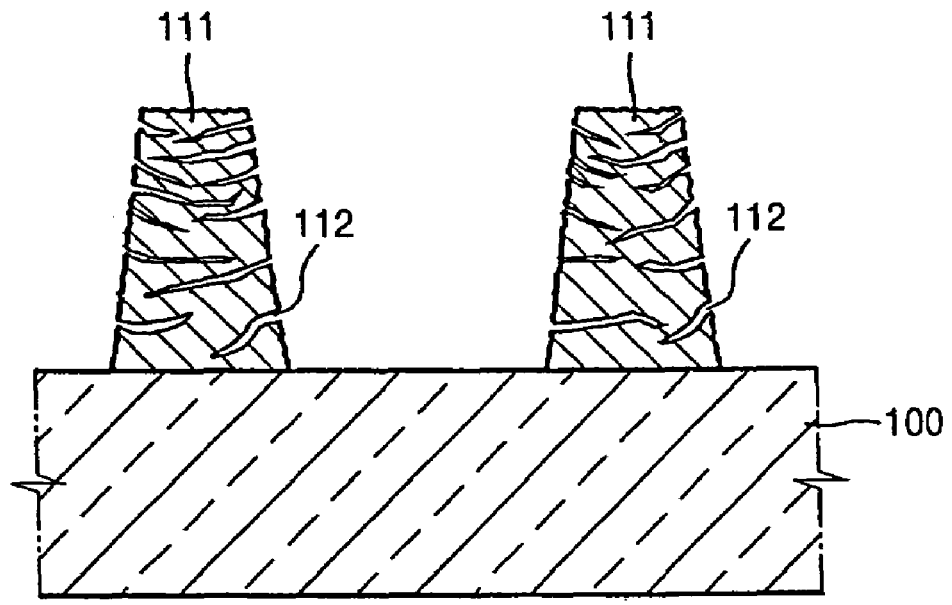
FIG. 6 illustrates the black matrices of FIG. 5. in which pores are formed according to the embodiment of the present general inventive concept.

FIG. 6 illustrates the black matrices 111 in which pores are formed according to the embodiment of the present general inventive concept.

Referring to FIG. 5A-6, a plurality of pores 112 are formed irregularly by softly baking the light-shielding layer 110 and patterning the light-shielding layer 110 to form the black matrices 111. Surfaces of the black matrices 111 may be non-uniform. The plurality of pores 112 are formed in a direction from an outside surface of the black matrices 111 to an inside of the black matrices 111.

The plurality of pores 112 in the black matrices 111 are maintained, according to an embodiment of the present general inventive concept, by regulating or controlling a condition of s hard baking of the black matrices. For example, the black matrices 111 are not completely solidified by a first hard baking and the pores 112 are maintained in the black matrices 111 as illustrated in FIG. 6, then a second hard baking can be performed to solidify the black matrices 111 and dry an ink 113 injected into the pores 112 and the pixel areas defined by the black matrices 111 to form pixels as illustrated in FIG. 7B.

In particular, while hard-baking of black matrices, which enables the black matrices 111 to be completely solidified, is generally performed for about 30 to about 40 minutes at a temperature above 200° C., according to an embodiment of the present general inventive concept, the black matrices 111 are incompletely hard-baked only for about 10 to about 15 minutes at a temperature above 200° C. The incomplete hard-baking may be performed after the black matrices 111 are formed as illustrated in FIG. 5C, to maintain the pores 112 in the black matrices as illustrated in FIG. 6. Although FIG. 6 illustrated the pores 112 as spaced apart from one another, the present general inventive concept is not limited thereto, and the pores 112 extending from an outside surface into the inside of the black matrices 111 can extend toward an opposite outside surface of the black matrices 111 and can contact other pores 112 extending from the opposite outside surface.

Figure 7A:
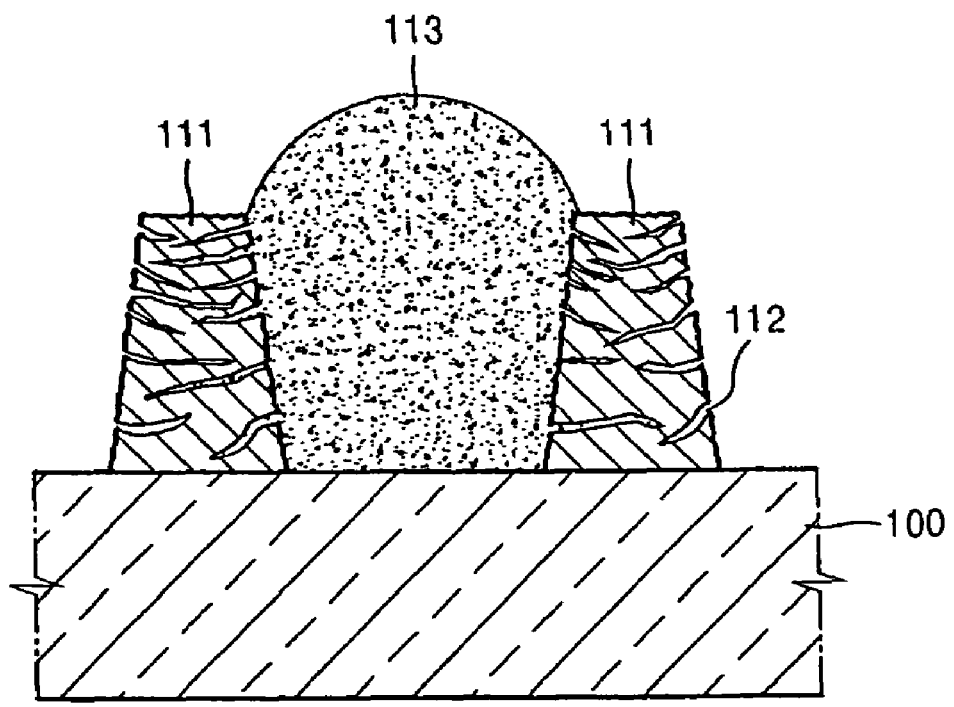
FIG. 7A illustrates a color ink that is injected into the black matrices illustrated in FIG. 6.
Figure 7B:
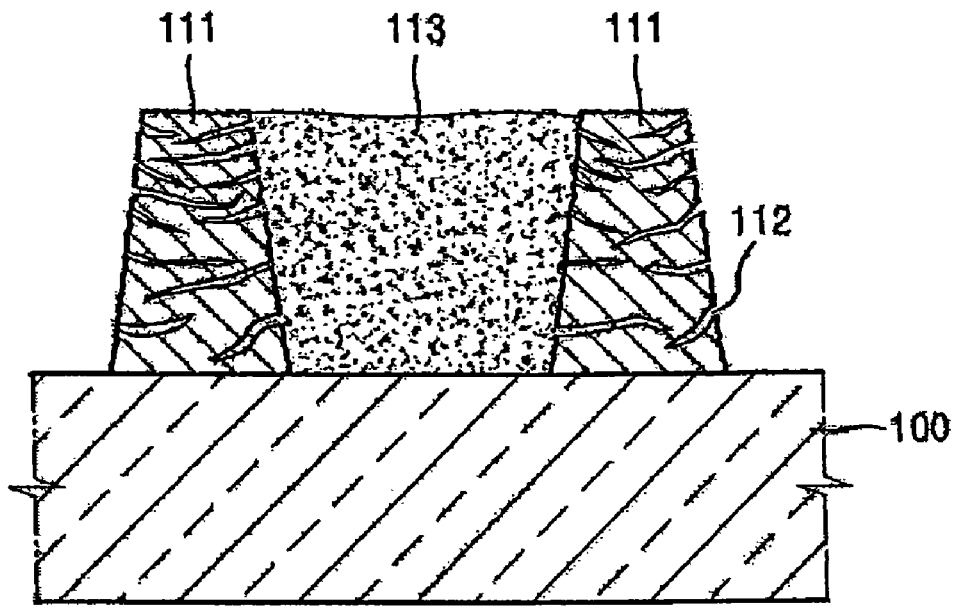
FIG. 7B illustrates the color ink that is injected into the black matrices illustrated in FIG. 7A and dried.

FIG. 7A illustrates a color ink that is injected into spaces partitioned by the black matrices 111 illustrated in FIG. 6, and FIG. 7B illustrates the color ink that is injected into spaces partitioned by the black matrices 111 illustrated in FIG. 7A and dried.

Referring to FIG. 7A, a color ink 113 fills a space partitioned by the black matrices 111 in which the plurality of pores 112 are formed after the incomplete hard-baking of the black matrices 111 is performed. Then, the color ink 113 permeates the pores 112 formed in the black matrices 111 by capillarity.

Referring to FIG. 7B, after the color ink 113 is injected to fill the space partitioned by the black matrices 111 as illustrated in FIG. 7A, the black matrices 111 and the color ink 113 are concurrently hard-baked. Thus, the black matrices 111 are completely solidified, and the color ink 113 is dried and also flatly solidified in the black matrices 111.

The color ink 113 that permeates the pores 112 is solidified in the pores 112. Thus, since the color ink 113 is prevented from sliding down the sides of the black matrices 111, the color ink 113 is dried between the black matrices 111, thereby having a uniform thickness. Accordingly, light leakage caused by a non-uniform thickness of the color ink 113, which is due to the repulsion force between the black matrices 111 and the ink 113, is prevented.

Results obtained from employing a method according to an embodiment of the present general inventive concept of filling the space partitioned by the black matrices 111 with the color ink using the pores 112 in the black matrices 111 is illustrated in the following photographs and graphs.

Figure 8A:
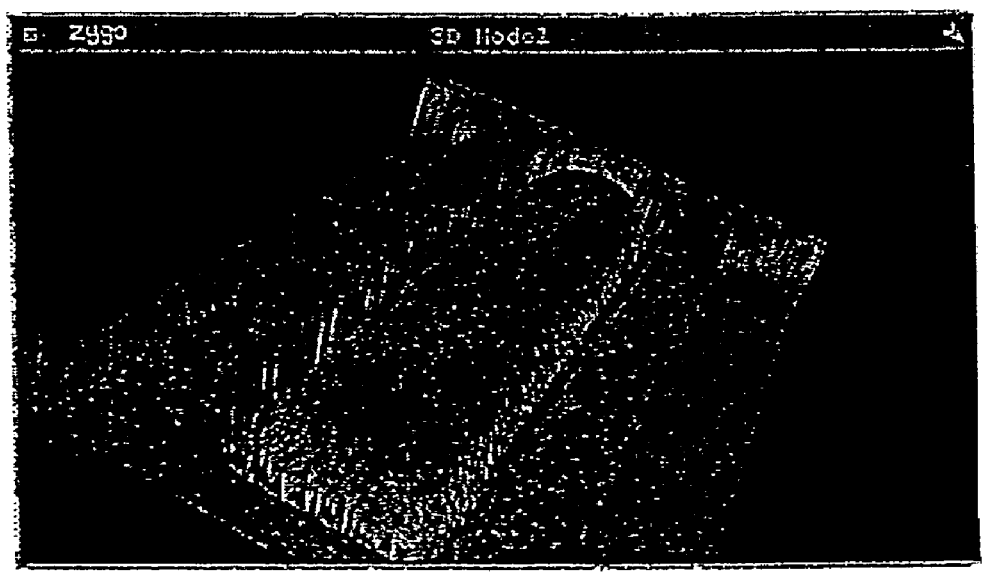
FIG. 8A is a photograph illustrating a conventional color filter fabricated by filling spaces partitioned by black matrices without pores with a color ink.
Figure 8B:
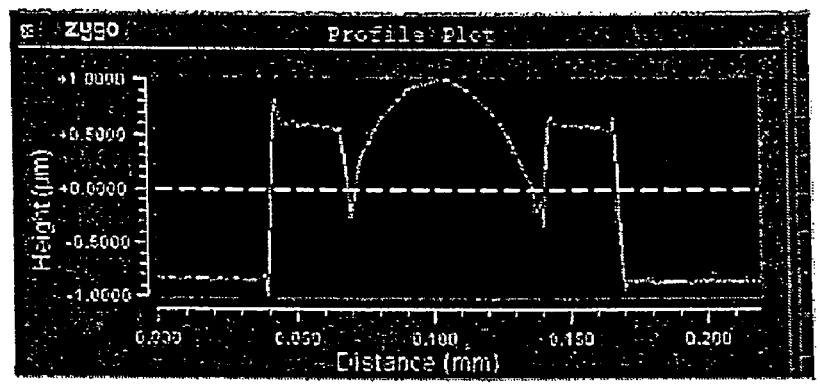
FIG. 8B is a graph illustrating a cross sectional profile of the conventional color filter illustrated in FIG. 8A.
Figure 9A:
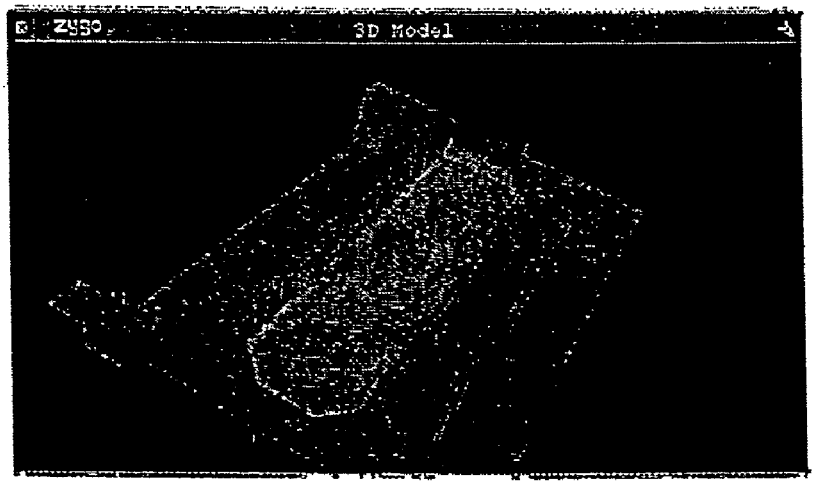
FIG. 9A is a photograph of a color filter fabricated according to an embodiment of the present general inventive concept, by filling spaces partitioned by black matrices with pores with a color ink.

FIG. 8A is a photograph illustrating a conventional color filter fabricated by filling a space partitioned by black matrices without pores with a color ink, and FIG. 8B is a graph illustrating a cross sectional profile of the conventional color filter illustrated in FIG. 8A. FIG. 9A is a photograph illustrating a color filter fabricated according to an embodiment of the present general inventive concept, by filling a space partitioned by black matrices with pores with a color ink, and FIG. 9B is a graph illustrating a cross sectional profile of the color filter illustrated in FIG. 9A.

Referring to FIGS. 8A and 8B, when the color ink fills the space partitioned by the black matrices repulsive to ink, the contact angle between the color ink and the black matrices becomes larger due to the repulsive force, and the color ink does not make contact with the sides of the black matrices, to thereby non-uniformly fill the space.

Figure 9B:
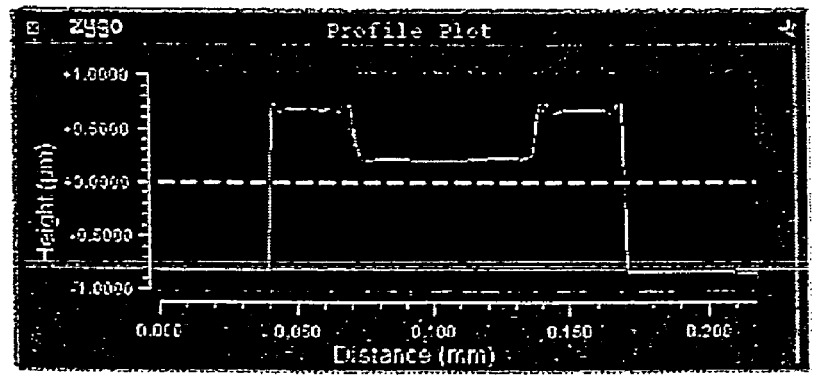
FIG. 9B is a graph illustrating a cross sectional profile of the color filter illustrated in FIG. 9A.

On the other hand, referring to FIGS. 9A and 9B, when pores are formed in the black matrices and the color ink fills the space partitioned by the black matrices, the color ink fills the pores in the black matrices and makes contact with the side walls of the black matrices, thereby uniformly filling the space partitioned by the black matrices.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of fabricating black matrices of a color filter, the method comprising:
    forming a light-shielding layer of an organic material repulsive to an ink on a transparent substrate;
    forming the black matrices by patterning the light-shielding layer;
    pre hard-baking the black matrices to maintain a plurality of pores which are irregularly formed in the black matrices in the forming of the light-shielding layer;
    injecting color ink to fill spaces partitioned by the black matrices; and
    hard-baking the black matrices and the color ink to completely dry the color ink which permeates the plurality of pores formed in the black matrices,
    wherein the time of the pre hard baking is shorter than the time of the complete hard baking.

2. The method of claim 1, wherein the pre hard-baking is performed for 10 to 15 minutes at a temperature above about 200° C.

3. The method of claim 1, wherein the complete hard-baking is performed for 30 to 40 minutes at a temperature above about 200° C.

* * * * *